(12) United States Patent
Mindlin et al.

(10) Patent No.: US 11,871,208 B2
(45) Date of Patent: Jan. 9, 2024

(54) METHODS AND SYSTEMS FOR SPATIAL RENDERING OF MULTI-USER VOICE COMMUNICATION

(71) Applicant: Verizon Patent and Licensing Inc., Basking Ridge, NJ (US)

(72) Inventors: Samuel Charles Mindlin, Pittsburgh, PA (US); Kunal Jathal, North Hills, CA (US); William Robert Davey, Somerville, NJ (US); Scott David Brown, Grayson, GA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 4 days.

(21) Appl. No.: 17/576,731

(22) Filed: Jan. 14, 2022

(65) Prior Publication Data
US 2023/0232177 A1    Jul. 20, 2023

(51) Int. Cl.
| | | |
|---|---|---|
| *G06F 15/16* | (2006.01) | |
| *H04S 7/00* | (2006.01) | |
| *H04L 65/403* | (2022.01) | |
| *H04L 9/40* | (2022.01) | |
| *H04L 67/104* | (2022.01) | |
| *G06F 3/0482* | (2013.01) | |

(52) U.S. Cl.
CPC .......... *H04S 7/303* (2013.01); *H04L 63/0853* (2013.01); *H04L 65/403* (2013.01); *H04L 67/104* (2013.01); *G06F 3/0482* (2013.01); *H04S 2400/11* (2013.01)

(58) Field of Classification Search
CPC .. H04S 7/303; H04S 2400/11; H04L 63/0853; H04L 65/403; H04L 67/104; G06F 3/0482
See application file for complete search history.

(56) References Cited

U.S. PATENT DOCUMENTS

| | | | |
|---|---|---|---|
| 8,578,000 B2 * | 11/2013 | Van Wie | A63F 13/30 709/250 |
| 11,412,011 B1 * | 8/2022 | Benjamin | H04L 67/02 |
| 2007/0025538 A1 * | 2/2007 | Jarske | H04M 3/56 379/202.01 |

(Continued)

FOREIGN PATENT DOCUMENTS

EP    3664477 A1 *  6/2020  ......... G06K 9/00362

*Primary Examiner* — Ario Etienne
*Assistant Examiner* — Thorne E Waugh

(57) ABSTRACT

An illustrative application executing on a first device establishes a first network connection between the first device and a collaboration platform server managing a set of components for a collaboration platform providing voice communication services with respect to a virtual space. Using the first network connection, the application: 1) sets a first location within the virtual space at which a first voice component is positioned, and 2) determines a second location within the virtual space at which a second voice component is positioned. The application receives, by way of a second network connection between the first and second devices, audio data representing voice communication originating at the second device. Based on the first and second locations, the application generates a spatialized rendering of the audio data for presentation to a user. Corresponding methods and systems are also disclosed.

20 Claims, 9 Drawing Sheets

(56) References Cited

U.S. PATENT DOCUMENTS

| | | | | |
|---|---|---|---|---|
| 2011/0096915 A1* | 4/2011 | Nemer | ............... | H04M 3/568 |
| | | | | 379/158 |
| 2013/0236040 A1* | 9/2013 | Crawford | ............... | H04S 7/306 |
| | | | | 381/310 |
| 2018/0343534 A1* | 11/2018 | Norris | ............... | G06V 40/161 |
| 2019/0208345 A1* | 7/2019 | Mindlin | ............... | H04R 5/04 |
| 2020/0186954 A1* | 6/2020 | Sim | ............... | H04R 5/033 |
| 2021/0349604 A1* | 11/2021 | Van Wie | ............... | G06F 16/9537 |
| 2022/0103963 A1* | 3/2022 | Satongar | ............... | G06F 3/0486 |

* cited by examiner

METHODS AND SYSTEMS FOR SPATIAL RENDERING OF MULTI-USER VOICE COMMUNICATION

BACKGROUND INFORMATION

Since the inception of electronic and then digital communication, demand has increased for ever more effective, convenient, and flexible modes of communication between people who are located remotely from one another. Recent increases in the number of people who perform some or all their work from home or other convenient locations, rather than from a physical office space or other shared physical space, have been dramatic and have only furthered this trend.

Many positive consequences have attended increases in remote communication and telecommuting. Unfortunately, along with gains in efficiency, certain communication challenges have also presented themselves. For example, people communicating remotely using conventional technologies (e.g., phone calls, video conferencing, etc.) may lose various subtle aspects of sharing and communicating within a common physical space, including a sense of spatial continuity between coworkers, nuanced social cues regarding whether other people are available to talk, an ability to strike up spontaneous and impromptu conversations (e.g., without pre-scheduling a time for a call, etc.), and so forth.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF EXAMPLE EMBODIMENTS

Figure 1:
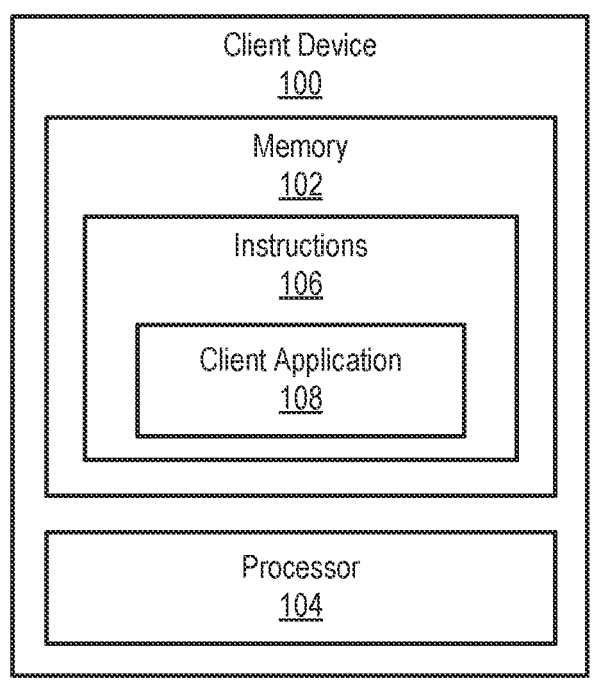
FIG. 1 shows an illustrative device configured to execute a application that performs spatial rendering of multi-user voice communication in accordance with principles described herein.

Methods and systems for spatial rendering of multi-user voice communication are described herein. As mentioned above, trends of increased remote communication using conventional technologies such as phone calls, video conferencing, text messaging, and so forth have unfortunately been coupled with the decreases in certain desirable aspects of communication inherent to in-person (i.e., non-remote) communication. As a consequence, collaboration platforms described herein aim to maintain all the advantages of remote communication while also providing certain benefits of in-person communication that have been diminished as remote communication has become normalized and in-person communication has become more infrequent. In particular, collaboration platforms described herein are configured to facilitate communication and collaboration between users who are remote from one another by associating each user with a respective virtual location within a virtual space shared by all of the users, and by providing tools to allow natural forms of communication between users in accordance with their virtual locations.

For example, one shared virtual space may implement a virtual workspace (e.g., a virtual office, etc.) that may or may not have an analog in the real world (e.g., a real workspace that the virtual workspace is configured to simulate). A first user physically located at his home may log onto the collaboration platform to be virtually placed within this virtual workspace at a particular virtual location such as at a first virtual desk assigned to the first user. Similarly, a second user physically located at her home (i.e., a home remote from the home of the first user) may separately log onto the collaboration platform to be virtually placed within the same virtual workspace at a different virtual location such as at a second virtual desk assigned to the second user (and, for example, near the first virtual desk of the first user). While logged onto this collaboration platform, the first and second users may not only have an ability to communicate using conventional modes of communication (e.g., private phone or video calls, traditional video conferences with themselves and possibly other users, text messaging or chatting, email-based communications, etc.), but may also be able to communicate in more spontaneous and impromptu ways based on their respective locations. For example, the first user may move an avatar that represents himself within the virtual space into a vicinity of an avatar representing the second user within the virtual space and, without explicitly opening any communication channel or otherwise initiating a formal communication session (e.g., without placing a call, joining a meeting, sending a notification, etc.), the first user may talk to the second user by simply beginning to speak.

Based on the proximity of the avatars of the two users in the virtual workspace, the second user may hear the communication spoken by the first user in a manner analogous to being spontaneously approached by a coworker in a real-world workspace. In some examples, as will be described in more detail below, the communication may even be spatialized such that the second user hears the first user's voice as if originating from the location of the first avatar with respect to the second avatar. For example, if the first avatar is behind and slightly to the right of the second avatar, the voice communication presented to the second user may be spatialized so as to appear to originate behind and slightly to the right of the second user in her home. The second user could then speak in turn and an impromptu conversation between the users could ensue, all without any planning or pre-initiation of a formal communication session. In some implementations or operating modes, the shared virtual space and the avatars within it may be presented in a 2D manner (e.g., as flat icons within a 2D space represented from an overhead view). In other implementations or operating modes, the shared virtual space and the avatars within it may be presented in 3D and/or using extended reality (XR) technologies such as virtual reality (VR) and/or augmented reality (AR) technologies to allow for an increased sense of immersion into the virtual space.

While the scenario described above involving impromptu communication between two users may seem relatively simple, it will be understood that it becomes far more complicated to simulate a virtual workspace containing a larger number of users that are each presented spatialized communications from all the other users virtually surrounding them in the virtual space (e.g., some closer and some farther away, some on the left and some on the right, some in front and some behind, etc.). Accordingly, methods and systems described herein for spatial rendering of multi-user voice communication use a network architecture described herein to exchange audio streams between devices used by different users (referred to herein as "client devices"), and to associate those audio streams with voice components managed by a server that is responsible for all of the participants virtually located within a particular space (e.g., a particular room, a set of rooms, etc.). For example, using techniques described herein, such a server (a "collaboration platform server") may associate a voice component for an avatar with other components making up the avatar of a particular user in the virtual space (e.g., a mesh component defining how the avatar should look, a transform component defining where the avatar is located and/or how the avatar is posed, etc.), and may determine that an incoming audio stream is to be associated with the voice component for that avatar. In this way, each of a plurality of incoming audio streams that arrive directly from other client devices (e.g., via direct peer-to-peer network connections or other suitable network connections) may be properly associated with their respective voice components so as to thereby be "spatialized" (i.e., simulated as originating from the locations of the respective avatars/voice components, and, in certain example, simulated as propagating from those locations through the virtual space to the listener).

Various servers and other computing devices, data communications between such devices, and data operations executed by such devices may be deployed to enable the methods and systems for spatial rendering of multi-user voice communication described herein. For example, along with the various client devices used by the users to engage with the collaboration platform, at least one collaboration platform server configured to manage the virtual space and the components within it may be present within a given configuration. The client devices and collaboration platform server may also receive security, signaling, networking, and/or other types of assistance from other devices such as, without limitation, portal servers, forwarder servers, signaling servers, and STUN/TURN servers described herein. A unique identifier (e.g., a handle combining a user-selected username and a random number, a randomly-generated username, etc.) may be used by systems and connections responsible both for the components of the virtual space (e.g., the voice components, other avatar components, components of non-avatar objects within the space, etc.) and for the transfer of audio data (e.g., voice communications) between client devices. Accordingly, as will be described in more detail below, the unique identifier may serve as a common reference to associate voice components, audio data, and other unrelated data or objects together in a unified presentation of the virtual world of the collaboration platform.

Methods and systems described herein for spatial rendering of multi-user voice communication may provide various benefits and advantages to users and providers of collaboration platforms. These benefits and advantages may include, for example, the ability for one user to spontaneously engage in two-way impromptu communication with an arbitrary number of other users virtually located together with the user in a shared virtual space. Moreover, these impromptu communications may also be spatialized to simulate real-world communications in a manner that will provide many of the lost benefits of in-person communication while still maintaining all the conveniences of remote communication that have made it so popular.

Various specific implementations will now be described in detail with reference to the figures. It will be understood that the specific implementations described below are provided as non-limiting examples and may be applied in various situations. Additionally, it will be understood that other examples not explicitly described herein may also be captured by the scope of the claims set forth below. Methods and systems described herein for spatial rendering of multi-user voice communication may provide any of the benefits mentioned above, as well as various additional and/or alternative benefits that will be described and/or made apparent below.

FIG. 1 shows an illustrative device (referred to herein as a client device) configured to execute an application (referred to herein as a client application) that performs spatial rendering of multi-user voice communication in accordance with principles described herein. Client device 100 may be implemented by computer resources such as processors, memory facilities, storage facilities, communication interfaces, and so forth. For example, in certain implementations, client device 100 may be implemented by computing resources of a user equipment (UE) device such as a mobile device (e.g., a smartphone, a tablet device, etc.), a personal computer (e.g., a laptop or desktop computer system, etc.), or another device or system used by the end user. In other implementations, such UE devices may serve as merely an interface for the user to interact with resources (e.g., more powerful resources) of distributed computing systems such as multi-access edge compute (MEC) systems operated by a cellular data provider, multi-access cloud compute systems operated by a cloud-computing provider, or other suitable server systems. In still other implementations, a combination of computing resources of a UE device used by the user and a distributed computing device connected to the UE device may perform the operations that are described herein as being performed by client device 100.

As shown, client device 100 may include, without limitation, a memory 102 and a processor 104 selectively and communicatively coupled to one another. Memory 102 and processor 104 may each include or be implemented by computer hardware that is configured to store and/or execute computer software. Various other components of computer hardware and/or software not explicitly shown in FIG. 1 may also be included within client device 100. In some examples, memory 102 and processor 104 may be distributed between multiple devices and/or multiple locations as may serve a particular implementation.

Memory 102 may store and/or otherwise maintain executable data used by processor 104 to perform any of the functionality described herein. For example, memory 102 may store instructions 106 that may be executed by processor 104, and, as shown, may implement a client application 108 configured to perform various functions described herein. Memory 102 may be implemented by one or more memory or storage devices, including any memory or storage devices described herein, that are configured to store data in a transitory or non-transitory manner. Instructions 106 may be executed by processor 104 to cause client device 100 to perform any of the functionality described herein, including functionality described herein to be performed by client application 108. Instructions 106 may be implemented by any suitable application (e.g., client application 108 and other applications not explicitly shown in FIG. 1), software, script, code, and/or other executable data instance. Additionally, memory 102 may also maintain any other data accessed, managed, used, and/or transmitted by processor 104 in a particular implementation.

Processor 104 may be implemented by one or more computer processing devices, including general purpose processors (e.g., central processing units (CPUs), graphics processing units (CPUs), microprocessors, etc.), special purpose processors (e.g., application-specific integrated circuits (ASICs), field-programmable gate arrays (FPGAs), etc.), or the like. Using processor 104 (e.g., when processor 104 is directed to execute client application 108 represented by instructions 106 stored in memory 102), client device 100 may perform functions associated with spatial rendering of multi-user voice communication as described herein and/or as may serve a particular implementation.

Figure 2:
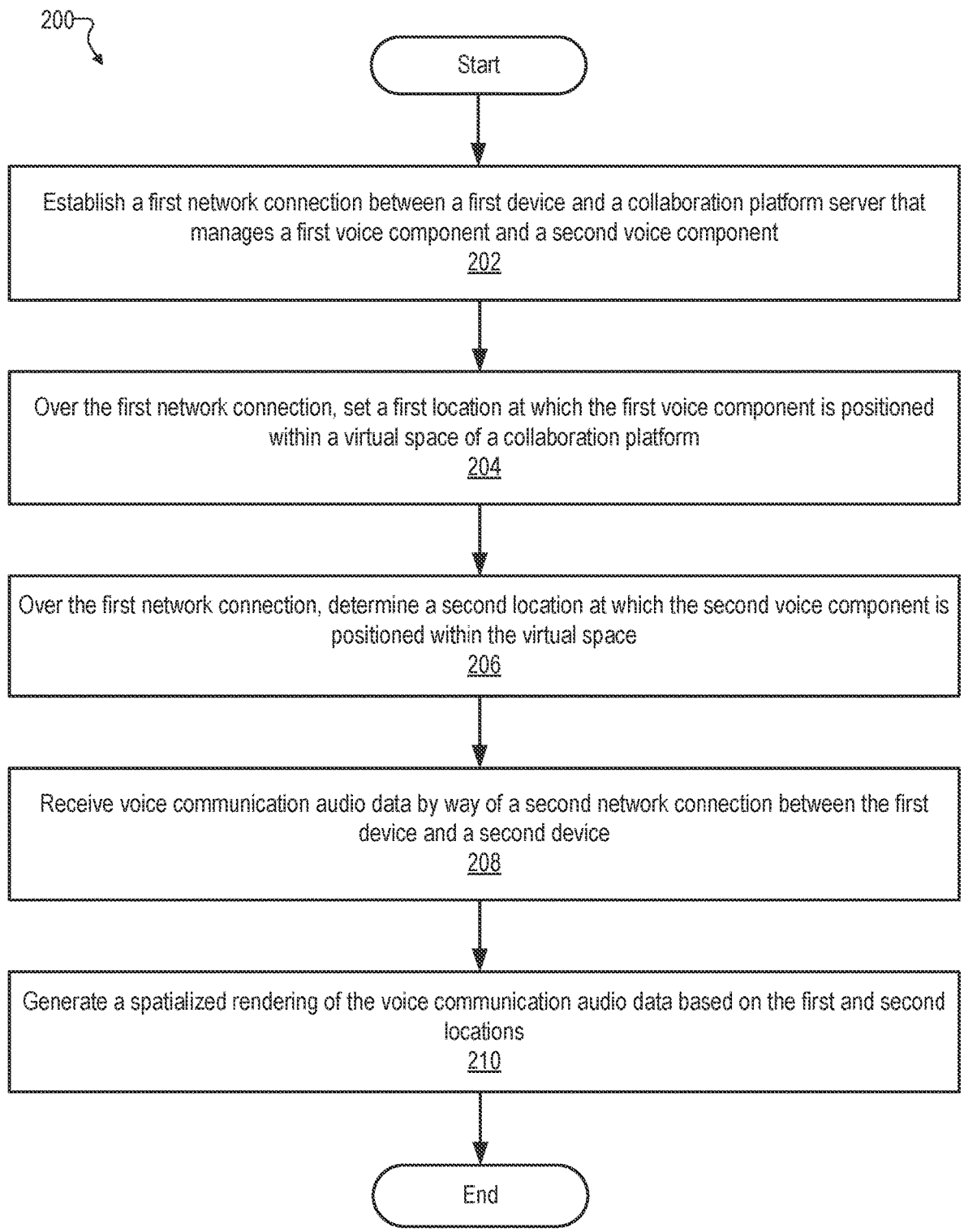
FIG. 2 shows an illustrative method for spatial rendering of multi-user voice communication in accordance with principles described herein.

As one example of functionality that client application 108 may perform, FIG. 2 shows an illustrative method 200 for spatial rendering of multi-user voice communication in accordance with principles described herein, While FIG. 2 shows illustrative operations according to one implementation, other implementations may omit, add to, reorder, and/or modify any of the operations shown in FIG. 2. In some examples, multiple operations shown in FIG. 2 or described in relation to FIG. 2 may be performed concurrently (e.g., in parallel) with one another, rather than being performed sequentially as illustrated and/or described. One or more of the operations shown in FIG. 2 may be performed by client application 108, or, in other words, may be performed by processor 104 as processor 104 executes instructions 106 that implement client application 108. While certain operations performed by client device 100 may also be associated with the execution of instructions 106 other than those specifically included as part of client application 108 (e.g., functions of driver software, operating system software, etc.), any functionality of client device 100 performed in the service of client application 108 (e.g., performed in furtherance of methods for spatial rendering of multi-user voice communication) may be referred to herein as being performed by chant application 108. This includes any functionality associated with method 200 and implementations thereof, regardless of which hardware or software elements of a given implementation of client device 100 are actually involved in performing the functionality.

In some examples, the operations of FIG. 2 may be performed in real time so as to provide, receive, process, and/or use data described herein immediately as the data is generated, updated, changed, exchanged, or otherwise becomes available. Moreover, certain operations described herein may involve real-time data, real-time representations, real-time conditions, and/or other real-time circumstances. As used herein, "real time" will be understood to relate to data processing and/or other actions that are performed immediately, as well as conditions and/or circumstances that are accounted for as they exist in the moment when the processing or other actions are performed. For example, a real-time operation may refer to an operation that is performed immediately and without undue delay, even if it is not possible for there to be absolutely zero delay. Similarly, real-time data, real-time representations, real-time conditions, and so forth, will be understood to refer to data, representations, and conditions that relate to a present moment in time or a moment in time when decisions are being made and operations are being performed (e.g., even if after a short delay), such that the data, representations, conditions, and so forth are temporally relevant to the decisions being made and/or the operations being performed.

Each of operations 202-210 of method 200 will now be described in more detail as the operations may be performed by a client application 108 executing on a first client device 100 operated by a user (e.g., by a processor 104 of the first client device 100 as the processor 104 executes instructions 106 stored in a memory 102 of the first client device At operation 202, the client application executing on the first client device may establish a first network connection between the first client device and a collaboration platform server. The collaboration platform server may be associated with a collaboration platform, such as described above, that provides voice communication services for the user and other users of other client devices with respect to a virtual space. For example, among other functions and responsibilities, the collaboration platform server may be configured to manage a set of components for the collaboration platform. The set of components may include various types of software components defining various types of data objects such as user avatars, virtual objects, acoustic properties, graphical properties, etc., that are to be represented within the shared virtual space If objects such as virtual desks and furniture (e.g., couches, chairs, lamps, etc.) are present in a shared virtual office space, for example, the collaboration platform server may manage mesh components, transform components, physics components (e.g., defining physical interactions and rules), and any other suitable components for each virtual desk, virtual item of furniture, and other virtual objects present in the space. Additionally, the set of components managed by the collaboration platform server may include components defining the appearance, location, pose, and behavior of an avatar of the user in the virtual space, as well as the avatars of other users of the collaboration platform.

One type of component that the collaboration platform server may manage for each avatar is referred to herein as a voice component. A voice component may be used to present voice communications (or other audio) that originate with a particular avatar (e.g., spoken into a client device by the user associated with that avatar). For instance, for the following example, the set of components managed by the collaboration platform server may include at least a first voice component configured to manage voice communication originating at the first client device, as well as a second voice component configured to manage voice communication originating at a second client device separate from the first client device (e.g., another client device used by a second user located remotely from the user of the first client device). As will be described in more detail below, since a voice component is associated with other components defining other aspects of the avatar in the virtual space (e.g., a transform component defining the location of the avatar, a mesh component defining the appearance of the avatar, etc.), once audio data is associated with the voice component, the audio data may become associated with (e.g. tied to, simulated as originating from) the location, pose, and/or other characteristics of the avatar that the voice component corresponds to.

At operation 204, the client application may set a first location, within the virtual space, at which the first voice component is positioned. For example, the client application may, by way of communication with the collaboration platform server over the first network connection established at operation 202, request and be granted authority over where the avatar of the user is located within the world (e.g., by gaining authority over a transform component of the avatar or in another suitable way). In this way, though the collaboration platform server may maintain the master version of the first voice component that will be used by all the relevant client devices participating in the collaboration platform, the client application of the first client device may have control over the virtual location (i.e., the location within the virtual space) at which the first voice component is positioned at any given time.

In like manner, a client application executing on the second client device may similarly have authority over the location of the second voice component that is also managed by the collaboration platform server and shared with other participating client devices. As such, the client application of the second client device may similarly set the location of the second voice component to a second location within the virtual space. Though the collaboration platform server may grant authority to respective client devices to set the locations of the voice components, the collaboration platform server may maintain the master versions of the voice components and replicate the respective voice components to each client device so that each client device can properly represent the voice components (with their proper locations and other characteristics) in the respective presentations of the collaboration platform to the respective users of the client devices.

At operation 206, for example, the client application of the first client device may determine (e.g., based on further communication with the collaboration platform server over the first network connection established at operation 202) a second location, within the virtual space, at which the second voice component is positioned. For example, after the second client device has set the second location for the master second voice component managed by the collaboration platform server, the collaboration platform server may replicate the second voice component to the first client device using the first network connection such that the first client device receives the information about the second location where the second voice component is positioned. While this example focuses on the perspective of the first client device as it sets the location of the first voice component and determines the location of the second voice component, it will be understood that the second client device may be performing analogous operations in parallel (e.g., communicating with the collaboration platform server by way of its own network connection to set the location of the second voice component, determine the location of the first voice component, etc.).

At operation 208, the client application may receive audio data representative of voice communication originating at the second client device. For example, as will be described in more detail below, a second network connection between the first client device and the second client device (e.g., a direct peer-to-peer connection, etc.) may be established using information provided by the collaboration platform server over the first network connection (as well as, in certain implementations, information provided by other servers described herein). The second network connection may then allow for direct data transfer of voice communication and/or other audio data between the first and second client devices.

At operation 210, the client application may generate a spatialized rendering of the audio data received at operation 208 for presentation to the user. This spatialized rendering generated at operation 210 may be performed based on the first location set at operation 204 and based on the second location determined at operation 206. For example, as will be described in more detail below, the client application may use a unique identifier assigned by the collaboration platform server to the second voice component (e.g., when the second voice component was replicated, etc.) to associate the audio data received over the second network connection (which may indicate the same unique identifier when transmitted by the second client device) with the second voice component. Once the audio data is associated with the second voice component, the voice communication represented by the audio data may be rendered in a manner that accounts for the second location of the second voice component with respect to the first location of the first voice component (which also is the location of the user's avatar, where the user is simulated to be listening from). For instance, spatialized rendering techniques may be used to simulate the virtual propagation of sound from the second location to the first location, taking into account the distance between these locations, the direction of sound projection from the second (speaking) avatar, the head pose of the first (listening) avatar, objects in the space that may interact with the virtual sound or otherwise influence the propagation (e.g., absorbing sound to create dampening effects or to change the profile of the sound, reflecting sound to create reverberation and/or echo effects, etc.), and so forth.

While not shown explicitly in FIG. 2, it will be understood that after the spatialized rendering of the voice communication of the second user (along with other voice communications from other users and/or other sounds that may also be incorporated into the spatialized rendering) has been generated at operation 210, the spatialized rendering may be presented to the user. For example, the client application may direct headphones, loudspeakers, or other such sound reproduction devices associated with the client device to present the spatialized rendering as a multi-channel spatial audio stream (e.g., a binaural spatial audio stream, etc.) that simulates what the avatar hears in the virtual space.

Figure 3:
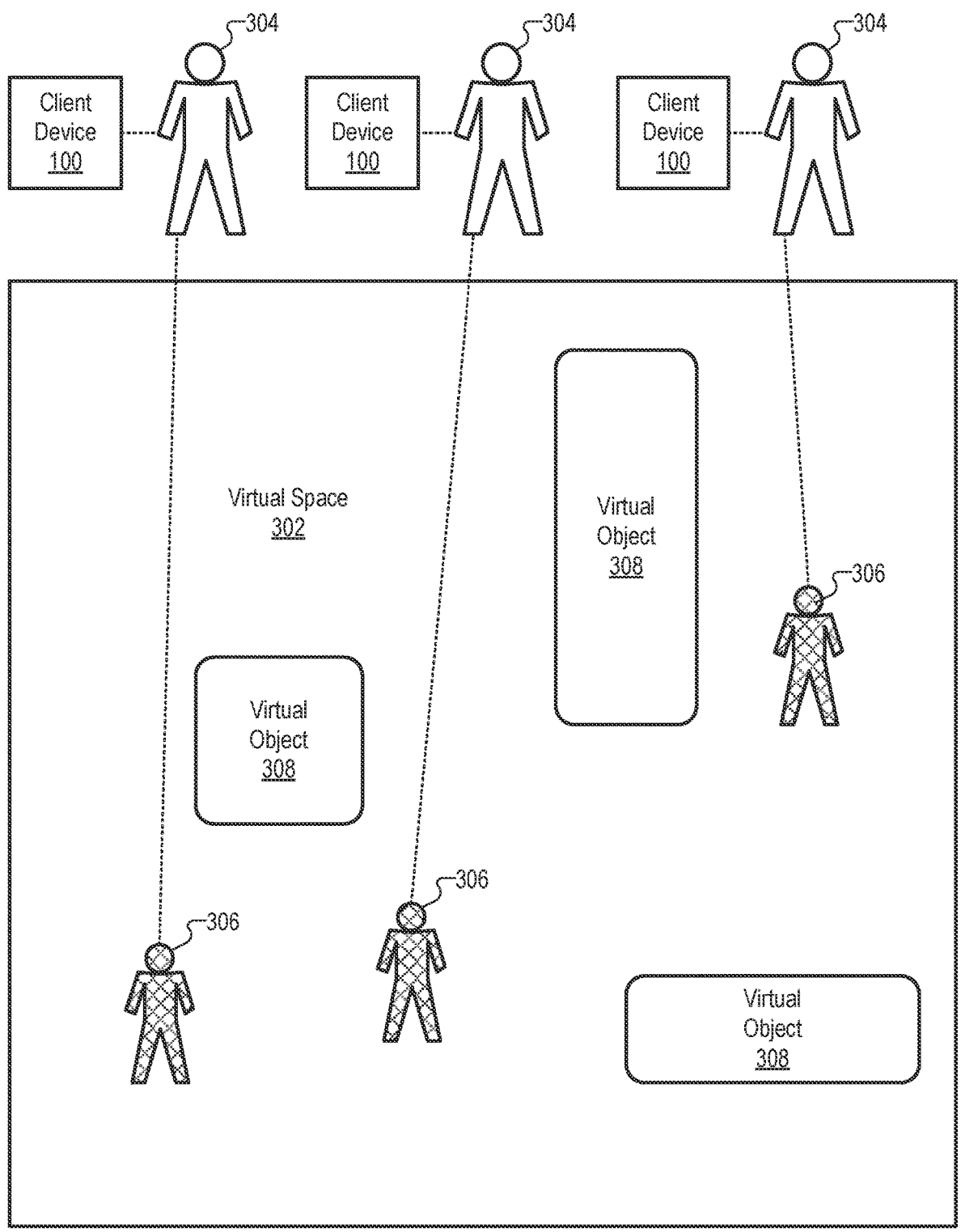
FIG. 3 shows illustrative elements of a collaboration platform that provides voice communication services for users of client devices in accordance with principles described herein.

To illustrate an example of the types of collaboration platforms that have been described to be used by users to communicate and otherwise collaborate with one another in a location-based manner designed to simulate certain aspects of real-world communication (e.g., impromptu communication, spatialized communication, etc.), FIG. 3 will now be described. FIG. 3 shows illustrative elements of a collaboration platform 300 that provides voice communication services for users of client devices in accordance with principles described herein.

As shown in FIG. 3, collaboration platform 300 includes a virtual space 302 that is used by a plurality of users 304 each using their own client device 100 to access and participate in collaboration platform 300. While each user 304 and his or her client device 100 is illustrated to be outside of virtual space 302 in FIG. 3, dotted lines illustrate that users 304 are each represented within virtual space 302 by a respective avatar 306. In this illustration, avatars 306 are depicted to have a human form similar to users 304 that the avatars 306 represent. However, to distinguish avatars 306 from user 304, FIG. 3 shows avatars 306 to be smaller than users 304 and to be filled in with a hashing pattern (while users 304 are not filled in). It will be understood that the avatars 306 illustrated in FIG. 3 are examples only, and that certain implementations may represent users 304 with other types of avatars or profile icons that include a non-human form (e.g., an animal character, etc.), a simple geometric shape (e.g., a circle with a photo of the user, etc.), or any other suitable representation of the user as may serve a particular implementation.

Users 304 and their respective client devices 100 will be understood to be located at various locations that may be remote from one another and from a collaboration platform server that provides collaboration platform 300. For instance, two users 304 and their respective client devices 100 may be located in different rooms, different buildings, different cities, different states, or even different countries in different parts of the world. Regardless of this physical distance, however, FIG. 3 shows that avatars 306 serving as proxy for users 304 within virtual space 302 of collaboration platform 300 may allow users 304 to enjoy certain benefits of proximity, even if their proximity to one another is only a virtual one. For example, using avatars 306, the different users 304 may virtually work at their own desks or in their own office within virtual space 302, may approach and initiate communication with other users 304 (by way of those users own avatars 306 as those users work at their own desks or in their own offices within virtual space 302), and so forth.

Along with avatars 306, FIG. 3 also shows that various virtual objects 308 may be included in virtual space 302. Virtual space 302 and virtual objects 308 may be any suitable types of virtual space or objects as may serve a particular implementation. For instance, if virtual space 302 is a virtual office space, virtual objects 308 may include desks, cubicle partitions, office furniture, decorative plants, and so forth. As another example, if virtual space 302 is a virtual sports lounge, virtual objects 308 may include bars and barstools, couches and lounge chairs, televisions presenting sporting events, and so forth. Various other types of shared virtual spaces configured to host various types of events and functions (e.g., meetings, conferences, reunions, screening events, conventions, etc.) may similarly implement virtual space 302 and may contain any suitable virtual objects 308 as may serve a particular implementation.

As mentioned above and as will be described in more detail below, it may be desirable for users 304 not only to be able to communicate within virtual space 302, but to communicate in a manner that simulates various location-based and pose-based nuances of in-person communication. To this end, client devices 100 may be configured to generate spatialized renderings of audio data that account for various aspects of the location and pose of the avatars 306, the virtual objects 308, virtual walls and materials of which virtual space 302 is constructed, and so forth. As one example, a spatialized rendering of audio data generated by a client application 108 executing on a client device 100 may account for head turn data to simulate sound propagation from a second location (of another avatar whose user is speaking), through virtual space 302, to a virtual avatar 306 of the user 304 virtually positioned at a first location within the virtual space. In this example, the virtual avatar 306 is oriented in a manner selected by the user 304 and indicated by the head turn data. For instance, if the user 304 directs the virtual avatar 306 to be seated at a desk and facing in a particular direction, head turn data will cause the pose of the virtual avatar 306 to be oriented accordingly.

As another example, a spatialized rendering of audio data generated by a client application 108 executing on a client device 100 may account for acoustic propagation data to simulate sound propagation from the second location, through the virtual space 302, to the virtual avatar at the first location. For instance, the sound propagation may be simulated to interact with one or more virtual objects 308 between the first and second locations of the avatars 306 within virtual space 302, and an acoustic property of the virtual object 308 (e.g., the shape or position of the virtual object, the material from which the virtual object is constructed and the manner in which that material affects sound, etc.) may be represented by the acoustic propagation data. By accounting for acoustic propagation data and/or head turn data in these ways, the spatialized renderings of audio data generated by different client applications executing on client devices 100 may present audio to users 304 that is extremely immersive and that gives user 304 a strong sense of actually being present (and actually being able to communicate with others) within virtual space 302.

Figure 4:
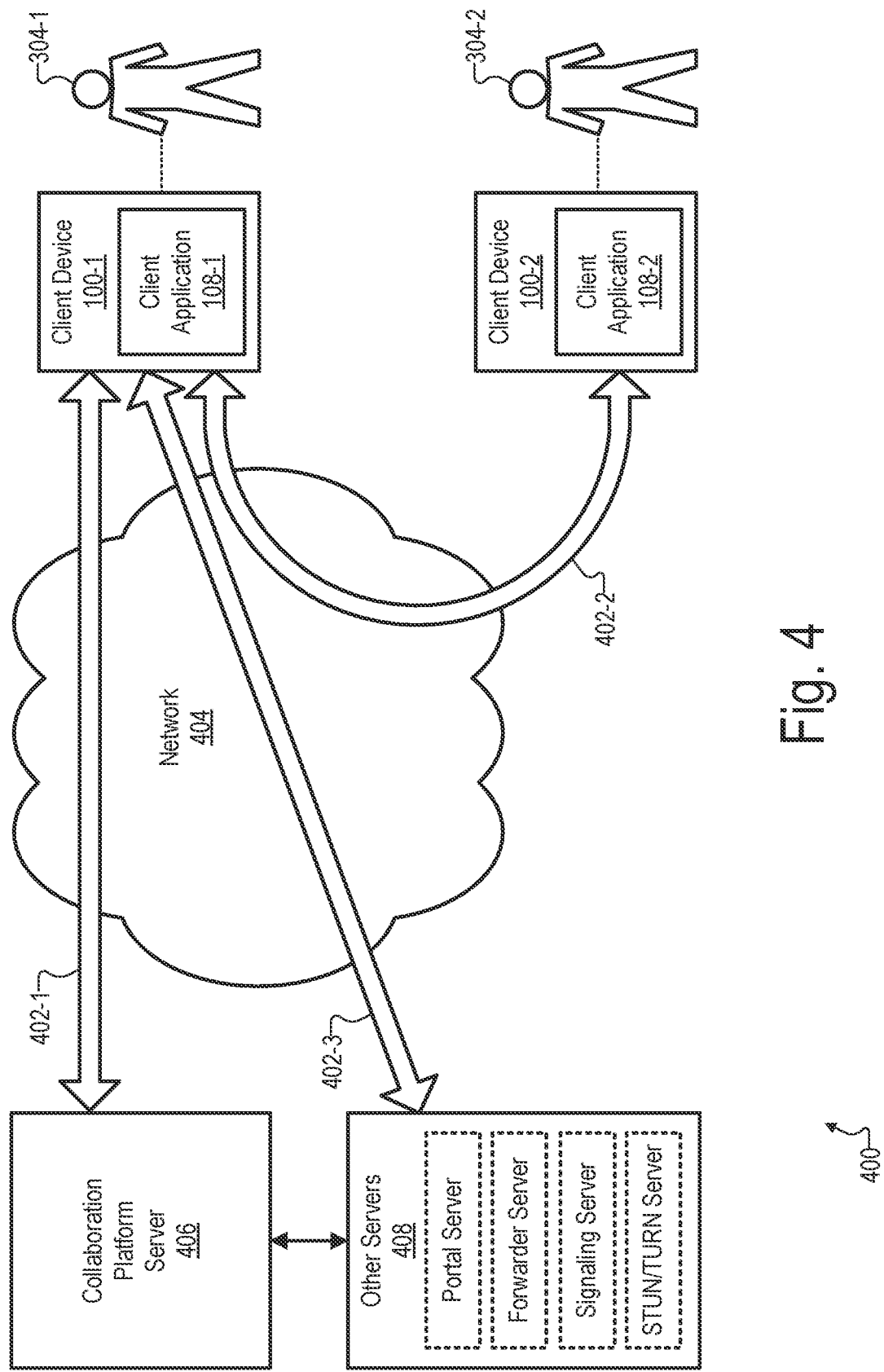
FIG. 4 shows an illustrative configuration within which client applications executing on client devices may implement spatial rendering of mufti-user voice communication in accordance with principles described herein.

FIG. 4 shows an illustrative configuration 400 within which client applications executing on client devices may implement spatial rendering of multi-user voice communication in accordance with principles described herein. More specifically, as shown, implementations of client device 100 labeled as client devices 100-1 and 100-2 are shown to be executing, respectively, client applications 108-1 and 108-2 while being used by, respectively, users 304-1 and 304-2. As with the example involving the first client device described above in relation to method 200, FIG. 4 places a particular emphasis on client device 100-1 and shows the connections that client device 100-1 has with other systems without explicitly showing all of the analogous connections that other client devices such as client device 100-2 may have. For example, FIG. 4 shows that client application 108-1 has established a first network connection 402-1 over a network 404 with a collaboration platform server 406. Additionally, FIG. 4 shows a second network connection 402-2 over network 404 that has been established between client devices 100-1 and 100-2, as well as a third network connection 402-3 over network 404 that has been established between client device 100-1 and one or more other servers 408 (including, without limitation, a portal server, a forwarder server, a signaling server, and a STUN/TURN server). While not explicitly shown in FIG. 4, it will be understood that client device 100-2 may similarly have established network connections with collaboration platform server 406 and/or other servers 408, and that additional client devices 100 may also be present and connected to collaboration platform server 406 and/or other servers 408.

Client devices 100 may be implemented as any suitable computing devices configured to present the virtual spaces of collaboration platforms and to support user experiences within those virtual spaces (e.g., viewing objects within the spaces, communicating and collaborating with other users by way of avatars within the virtual spaces, etc.) in any way as may serve a particular implementation. For instance, certain client devices 100 may be implemented by handheld mobile devices (e.g., general-purpose mobile devices such as smartphones or tablet devices), other client devices 100 may be implemented by head-mounted XR presentation devices (e.g., head-mounted VR or AR presentation devices, standard mobile devices mounted in front of the eyes by an apparatus, etc.), and still other client devices 100 may be implemented by laptop or desktop computers or other types of UE devices as may serve a particular implementation. In certain examples, a display device (e.g., a head-mounted display, a handheld screen, etc.) and a sound reproduction device (e.g., speakers, headphones, a surround sound system, etc.) may be integrated with or otherwise associated with client device 100 for use in presenting audiovisual content to users 304.

As has been described, client applications 108 within client devices 100 may be implemented as executable software running on whatever computing platform (e.g., Android, iOS, Windows, OSX, Linux, etc.) may be supported by a particular client device 100.

As shown, network 404 enables a server-client architecture between client devices 100 (on a client side) and collaboration platform server 406 and other servers 408 (on a server side) by allowing client devices 100 to communicate with collaboration platform server 406 and/or other servers 408 by way of network connections 402-1 and 402-3 pursuant to method 200 and/or other processes and dataflows described herein. Network 404 further enables client device 100-1 to communicate with client device 100-2 by way of a network connection such as network connection 402-2 (e.g., a direct peer-to-peer network connection, a connection facilitated by a server other than collaboration platform server 406, etc.). To this end, network 404 may include any network or networks configured to transport data between endpoints such as one or more client devices 100 and other devices or systems as may be present in a particular implementation. In some examples, network 404 may include or be associated with a local area network, a wide area network, or the Internet. Additionally, network 404 may include a provider network such as a cellular data network (e.g., a 5G network or data network of another suitable generation) that is managed by a service provider such as a telecommunications service provider (e.g., a cellular service provider), an application service provider, a storage service provider, an internet service provider, or the like.

Each of network connections 402 may use the resources of network 404 in any suitable manner to allow data to be exchanged between client device 100-1 and the other device or system on the other side of the network connection. In certain implementations, these network connections 402 may be merged or may represent a single connection or dataflow. For instance, collaboration platform server 406 and one or more of other servers 408 may be implemented by resources of the same cloud server system (e.g., an AWS EC2 server, etc.), such that network connections 402-1 and 402-3 represent connections to different software components running on the same hardware device. On the other hand, it may also be the case that network connections 402 are clearly distinct from one another. For example, network connections 402-1 and/or 402-3 of the server-client network may be distinct from the direct network connection 402-2 between client device 100-1 and client device 100-2. As such, network connection 402-2 may be implemented as a peer-to-peer connection by way of which data (e.g., audio data that has been mentioned and will be described in more detail below) may be delivered directly from client device 100-2 to client device 100-1 without assistance from an intermediary server such as collaboration platform server 406. As will be described in more detail below, other implementations of network connection 402-2, such as connections that are established when there is an issue establishing the direct connection shown in FIG. 4, may rely on the assistance of an intermediary server such as the STUN/TURN server, selective forwarding unit ("SFU"), or another suitable intermediary server (e.g., one of the other servers 408).

Collaboration platform server 406 may be implemented by a MEC, cloud, or other server system, and may represent an executable running on the server system hardware that enables the collaboration platform in various ways described herein. For example, collaboration platform server 406 may be implemented as a proprietary game server application responsible for coordinating the position, orientation, physical characteristics and other properties that make up the collaboration environment of one or more rooms or other areas of a collaboration platform virtual space. As has been described, collaboration platform server 406 may manage master versions of the components for all of these aspects of the collaboration platform and may be responsible for replicating the components to each client application 108 for each user 304 that is participating in the collaboration platform. The replication of these components may be performed in real time using network connection 402-1 (e.g., a UDP or other suitable connection) so that the positions and appearance of users in the room are kept in sync with each user regardless of whether collaboration platform server 406 maintains authority over changing the components or grants that authority to a client device 100 or other device (as described above in the example of the voice components whose locations are set by client devices).

Other servers 408 may represent other executables running on the same or different MEC or cloud system hardware as collaboration platform server 406 runs on. These servers may provide various types of support (e.g., room selection and session initialization support, security support, signaling support, networking support, etc.) to the collaboration platform primarily provided by collaboration platform server 406. While specific examples of other servers 408 are shown (by dotted lined boxes within other servers 408) in FIG. 4, it will be understood that zero or more of these other servers, as well as other types of servers not explicitly illustrated in FIG. 4 or described herein, may be used in a given implementation.

One or more portal servers may represent serverless services deployed to be responsible for maintaining a set of MEC or cloud systems (e.g., AWS EC2 instances, etc.) that host different collaboration platform servers (e.g., including collaboration platform server 406) for different collaboration spaces. For instance, as will be described in more detail below, a portal server may provide mechanisms for client applications to query the portal server for a list of available collaboration platform server instances associated with different portions of a virtual space (e.g., different virtual rooms of a particular virtual workspace, etc.) which the application can then attempt to connect to.

A forwarder server may represent a service deployed to be responsible for providing access to one or more signaling servers associated with each collaboration space that is available for a particular collaboration platform (e.g., each of several different virtual spaces of a collaboration platform implementing a virtual workspace). The forwarder server may be configured to validate a users access token (or otherwise help secure the connection) and to forward data traffic for that user onto the signaling server for the collaboration space they are trying to join.

A signaling server may represent an executable responsible for providing a communication protocol (e.g., an HTTP communication protocol, etc.) that client devices connecting to a collaboration platform may use to locate other users in the same virtual space so as to establish direct connections with them (e.g., peer-to-peer voice chat connections such as illustrated by network connection 402-2).

A STUN/TURN server may represent any type of STUN/TURN server (e.g., a coturn server, etc.) implemented by the MEC or cloud hardware system (e.g., the AWS EC2 server, etc.). This server may be shared by all the collaboration spaces hosted on the particular hardware system (e.g., serving multiple collaboration platform servers 406 executing on a single hardware system) to take responsibility for providing client devices network connection information about the client devices themselves to be utilized in establishing network connections (e.g., direct peer-to-peer network connections for voice chat communications) with other client devices. In addition, as mentioned above, a STUN/TURN server, an SFU, or another suitable intermediary may be utilized to route audio and data traffic to users in the event that efforts to establish direct peer-to-peer connections between client devices fail.

As mentioned above, one challenge that each client application 108 must address in an architecture such as that illustrated by configuration 400 is that software components replicated by a collaboration platform server onto a first client device using one network connection (e.g., voice components replicated by collaboration platform server 406 onto client device 100-1 over network connection 402-1) may not be associated with data received by way of unrelated network connections with other client devices (e.g., audio data received by way of network connection 402-2 from chant device 100-2). As such, client application 108-1 may be configured to associate voice chat data or other audio data received by way of network connection 402-2 (whether implemented as a direct peer-to-peer connection or an indirect connection through a suitable intermediary server) with the appropriate voice component replicated by collaboration platform server 406 by way of network connection 402-1 in any suitable way.

In certain implementations, for example, client application 108-1 may receive (e.g., over network connection 402-1) replication of first and second voice components managed by collaboration platform server 406. The first voice component may be a voice component for client application 108-1, for instance, while the second voice component may be a voice component for client application 108-2. The data received as part of this replication may include identifiers unique to each client application. For example, the data may include a first identifier assigned by collaboration platform server 406 to be unique to the first voice component, a second identifier assigned by collaboration platform server 406 to be unique to the second voice component, and other analogous identifiers assigned to be unique to any other components (e.g., voice components or other types of components) as may be replicated by collaboration platform server 406. Based on the first and second identifiers, client application 108-1 may establish the second network connection 402-2 between the client device 100-1 and client device 100-2, and these unique identifiers may be used when data is exchanged between the client devices. Accordingly, assuming that audio data received from client device 100-2 is associated with the second identifier when client device 100-1 receives the audio data, client application 108-1 may generate a spatialized rendering of the audio data based on the information imparted by that second identifier. Specifically, the generating of the spatialized rendering may include assigning, by client application 108-1 and based on the audio data being associated with the second identifier, the audio data to the second voice component at the second location within the virtual space at which the second voice component is positioned.

Figure 5:
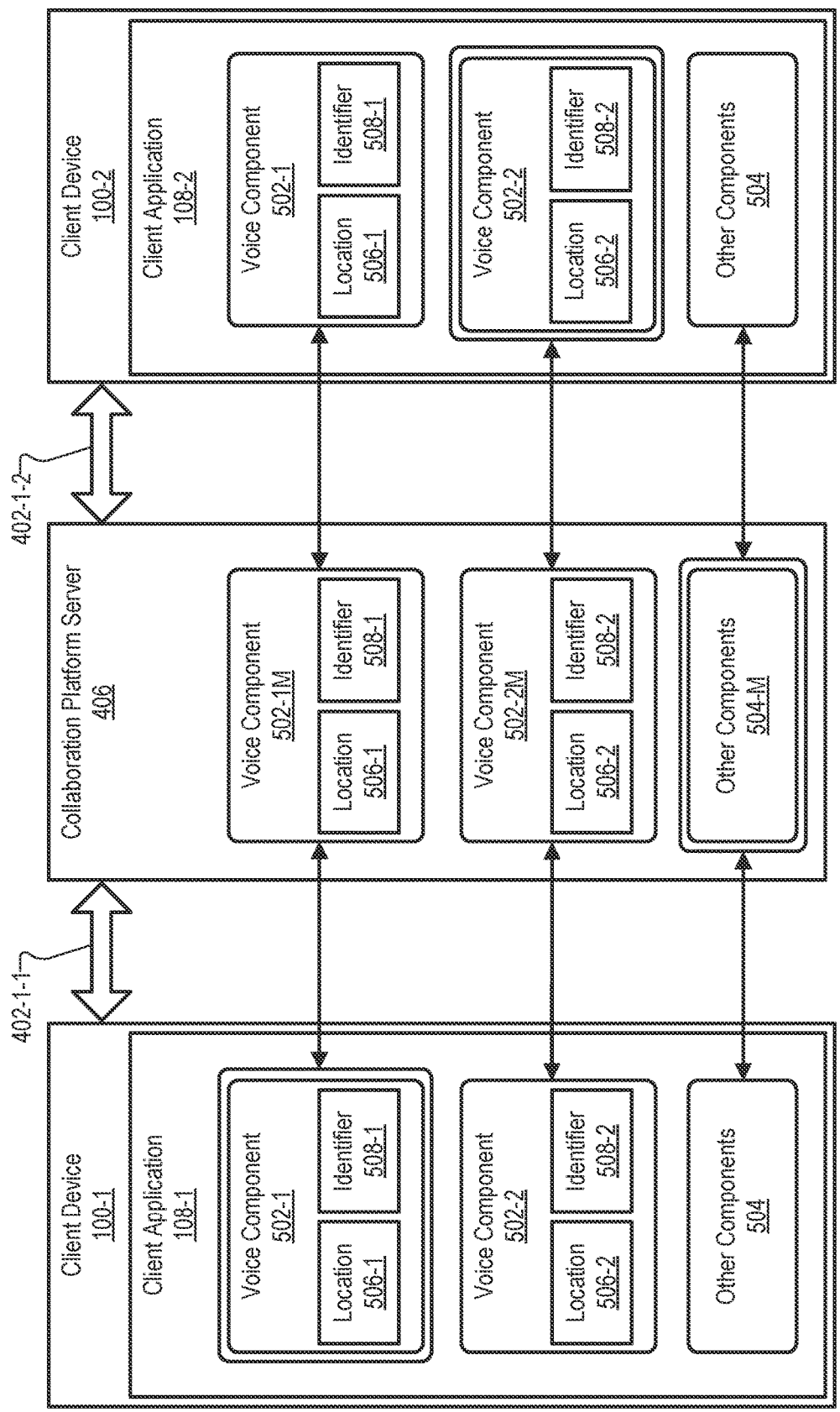
FIG. 5 shows illustrative aspects related to managing, replicating, and setting parameters of voice components and other components used to implement a collaboration platform in accordance with principles described herein.
Figure 6:
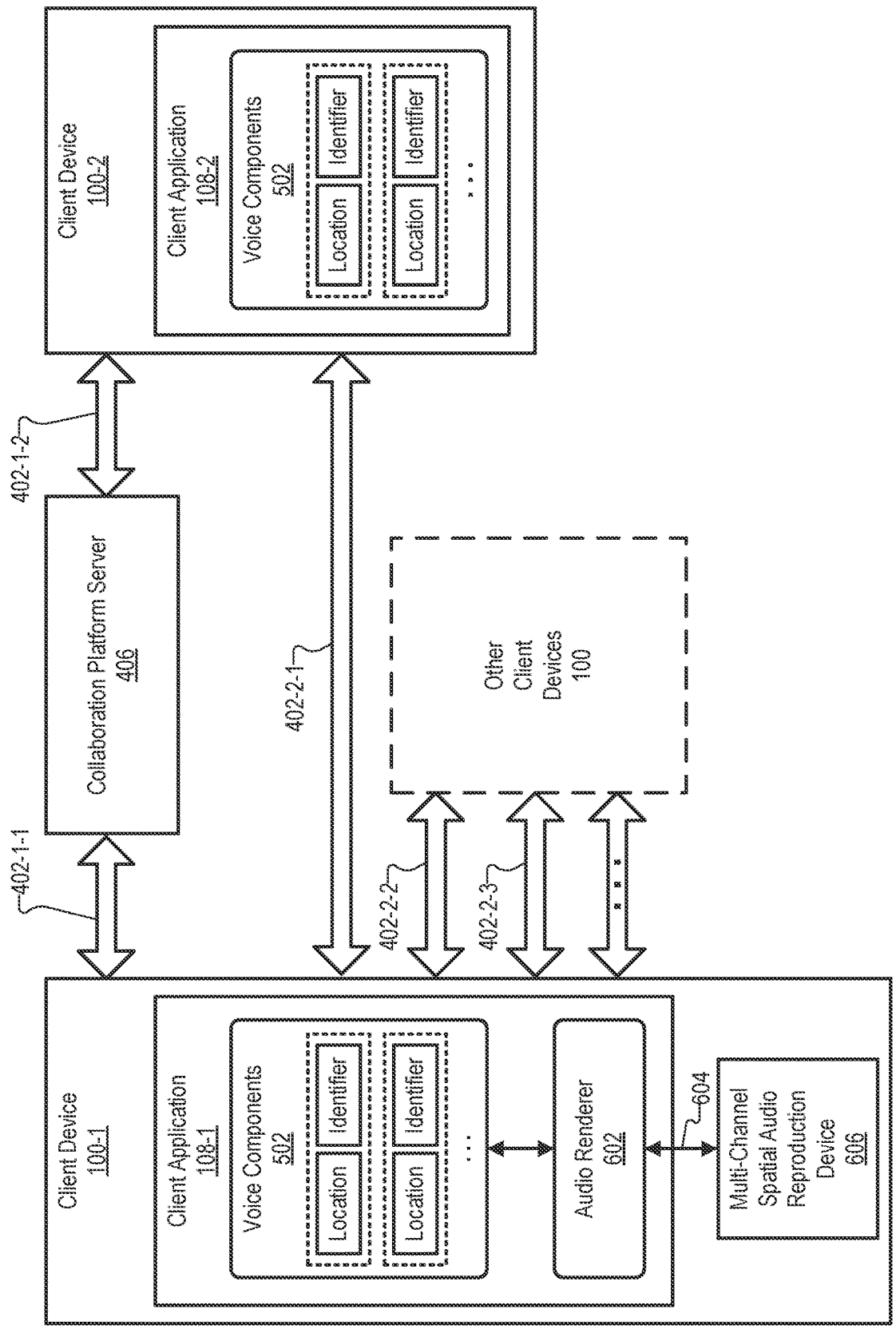
FIG. 6 shows illustrative aspects of how audio data representative of voice communication originating at various client devices may be processed to generate a spatialized rendering of the audio data in accordance with principles described herein.

To illustrate, FIG. 5 shows example aspects related to managing, replicating, and setting parameters of voice components (and other components) used to implement a collaboration platform, and FIG. 6 shows example aspects of how audio data representative of voice communication originating at various client devices may be processed to generate a spatialized rendering of the audio data.

As shown in FIG. 5, a plurality of voice components 502 (e.g., voice components labeled 502-1M and 502-2M in FIG. 5), as well as other components 504 (e.g., other components labeled 504-M in FIG, 5), may be managed by collaboration platform server 406. Each of these components will be understood to be a master version of the component (signified by the 'M' in the postfix of the reference designator) that can be replicated to one or more client applications 108. For example, as shown, voice component 502-1 is shown to be replicated to both client applications 108-1 and 108-2 (these are labeled without the 'M' since they are not the master version of the component) over, respectively, network connection 402-1-1 (the same network connection labeled "402-1" in FIG. 4) and network connection 402-1-2 (an analogous network connection to that labeled "402-1" in FIG. 4, but for client device 100-2). Similarly, voice component 502-2 and any number of other components 504 are also replicated from collaboration platform server 406 onto each client device 100 (including client devices 100-1 and 100-2, as shown).

Within each voice component 502, a respective location 506 and identifier 508 are shown. Specifically, voice component 502-1 (both the master and non-master versions) is shown to include a location 506-1 and an identifier 508-1, while voice component 502-2 (both the master and non-master versions) is shown to include a location 506-2 and an identifier 508-2. While other components 504 do not explicitly show locations 506 or identifiers 508, it will be understood that these components may have their own properties and characteristics (not explicitly shown) appropriate for the types of components they are.

Each location 506 may represent the location within the virtual space where the corresponding voice component 502 is positioned. This may be a property of the voice component 502 itself (as suggested by the illustration) or may be associated with the voice component 502 in another suitable way (such as by an association between the voice component 502 and a corresponding transform component of the avatar that is included within other components 504). Each identifier 508 may similarly be associated with each voice component 502 in a similarly flexible way.

As indicated by the 'M's in the reference numbers, collaboration platform server 406 may manage the master versions of the components to allow all the client devices 100 (e.g., client devices 100-1 and 100-2, as well as other client devices participating in the collaboration platform that are not explicitly shown) to synchronize their components to represent the same shared world. This does not mean, however, that collaboration platform server 406 necessarily retains all authority over each component. To the contrary, as illustrated by double boxes around certain components in FIG. 5, the authority over components may be transferred to the client devices as needed. In this example, for instance, authority for changing voice component 502-1 is shown to be granted to client application 108-1, authority for changing voice component 502-2 is shown to be granted to client application 108-2, and authority for changing other components 504 is shown to be retained by collaboration platform server 406. It will be understood that these are examples only and, particularly within the potentially large number of components represented by other components 504, full or partial authority for each of these may either be retained or granted to other devices as may be appropriate given the nature of the component.

As will be described in more detail below, the initialization, management, replication, and updating of voice components and their properties (e.g., locations, identifiers, etc.) may be performed by services such as a voice chat meta server executing within collaboration platform server 406 and a voice chat meta client executing within each client application 108. In operation, the voice chat meta server may be responsible for creating voice components 502 (e.g., audio voice chat streaming components) for each client device 100 that has joined a particular virtual space. As shown by the respective locations 506 associated with each voice component 502, these voice components may define where the voice stream for the corresponding users should originate from in the virtual space (e.g., within a 3D VR environment, a 2D environment, etc.). The voice chat meta server may further be configured to assign each client application a unique identifier 508 to be used in a given session (e.g., from when the user logs into the collaboration platform until the user logs off). Each identifier 508 may be generated based on a user-selected username, based on a random number or character sequence, or based on some combination of these or other identifying information suitable for uniquely identifying the different users. As shown, identifiers 508 may be stored inside voice components 502. The voice chat meta server may also be configured to provide a method by which client applications 108 may query connection details (e.g., identifiers 508, IP addresses, etc.) needed for establishing network connections with other servers 408 such as the signaling server, the STUN/TURN server, or the like.

The voice chat meta client implemented by each client application 108 may be configured to send a request to the voice chat meta server of the collaboration platform server 406 to determine which component instances are associated with this client application or this user. The voice chat meta client may then obtain the identifier 508 for its own client application 108 (e.g., identifier 508-1 in the case of client application 108-1, etc.) and obtain connection details for communicating with other servers 408 such as the STUN/TURN server. Additionally, the voice chat meta client may be configured to gain networked authority over certain voice component(s) instantiated by the voice chat meta server and may set the locations to match the location of the user's avatar within the virtual space. As mentioned above, the voice chat meta server may provide the connection details to the voice chat meta client on request, and may otherwise facilitate establishing a connection to other servers 408 such as the signaling and/or STUN/TURN servers for the collaboration platform server 406 that the client application 108 has connected to. In this way, the chant application 108 may join the voice chat session for the particular virtual space managed by the collaboration platform server 406. It will be understood that these operations are examples only and that additional or alternative communications between client application and the various servers and services described herein may be performed as may serve a particular implementation.

Similar to FIG. 5, FIG. 6 shows network connections 402-1 between collaboration platform server 406 and different client devices 100 (i.e., network connection 402-1-1 between collaboration platform server 406 and client device 100-1 and network connection 402-1-2 between collaboration platform server 406 and client device 100-2). FIG. 6 also similarly shows respective client applications 108 executing in the client devices (i.e., client application 108-1 executing in client device 100-1 and client application 108-2 executing in client device 100-2) to present the collaboration platform using various voice components 502 (illustrated by dotted lined boxes and shown to each include their respective locations and identifiers as described above in relation to FIG. 5). While not explicitly shown in FIG. 6, it will be understood that, just as illustrated and described in relation to FIG. 5, collaboration platform server 406 may manage master versions of each component and that other components (e.g., components 504 and/or other components not necessarily related to voice communications, etc.) may also be replicated to client applications 108.

While the focus of FIG. 5 was on the components themselves, the focus of FIG. 6 is rather on the network connections 402-2 between client devices 100 that allow each client application 108 to receive audio data representative of voice communication originating at other client devices (e.g., spoken by other users). As described above, network connections 402-2 may be direct peer-to-peer connections or other suitable network connections (e.g., connections using the STUN/TURN server or an SFU as an intermediary, etc.) that are distinct from network connections 402-1 and that do not use collaboration platform server 406 as an intermediary. As such, client applications 108 may be faced with the task of matching up audio data received from various client devices 100 over various network connections 402-2 with the different voice components 502 to which the audio data corresponds. For example, as shown in FIG. 6 for the case of client device 100-1, client application 108-1 may receive audio data over network connection 402-2-1 from client device 100-2, and may receive other audio data over respective network connections 402-2-2, 402-2-3, and other such network connections (illustrated by a connection labeled with an ellipsis) from a variety of other client devices 100 (not individually shown in FIG. 6 but represented by a dashed-line box labeled "Other Client Devices 100").

In other words, beyond the relatively simple configuration 400 shown in FIG. 4 that involves only two client devices 100, a more complex example may involve at least a third client device 100 (and perhaps many additional client devices 100), that would also be connected to client device 100-1 to communicate within the context of the collaboration platform. In such a configuration, client application 108-1 may determine, based on further communication with collaboration platform server 406 over network connection 402-1, a third location, within the virtual space, at which a third voice component is positioned. The third voice component may be included in the set of components managed by collaboration platform server 406 and may be configured to manage voice communication originating at the third client device (which may be separate from the first and second client devices). Client application 108-1 may then receive, by way of a third network connection between client device 100-1 and the third client device (e.g., one of network connections 402-2-2, 402-2-3, etc.), additional audio data representative of voice communication originating at the third client device. The spatialized rendering of the audio data would then be further based on the third location and would be generated to further include the additional audio data.

As has been mentioned, the audio data received on each network connection 402-2 may be associated with the respective identifier of the client device (i.e., the unique identifier assigned to the voice component for that client device when the device initially logged onto collaboration platform server 406). Accordingly, the task of matching up the audio data received over network connections 402-2 to the corresponding voice components 502 may be performed based on the identifiers. As one specific example, for instance, client application 108-1 may associate audio data received over network connection 402-2-1 with a voice component 502 that corresponds to client device 100-2 (i.e., voice component 502-2, described above in relation to FIG. 5). In this way, the audio data sent by client application 108-2 (i,e,, data representative of voice communication spoken by a user of client device 100-2) may be associated with the location of the avatar of the user of client device 100-2 (e.g., as client application 108-1 assigns the audio data to voice component 502-2 at the location 506-2 at which voice component 502-2 is positioned). It will be understood that client application 108-1 may assign other audio data received from other client devices 100 in the same way, Additionally, other client devices 100 may similarly manage voice components and assign audio data (e.g., from client device 100-1 and from one another) according to the same principles.

Once audio data is properly matched with and assigned to the proper corresponding voice components based on the identifiers (e.g., by the voice chat meta client querying the available voice components to search for one whose identifier matches the identifier associated with the audio stream arriving on the network connection 402-2, as has been described), FIG. 6 shows an audio renderer 602 configured to process data from voice components 502. Specifically, audio renderer 602 may generate a spatialized rendering 604 of audio data (e.g., received from voice components 502) and may provide spatialized rendering 604 to a multi-channel spatial audio reproduction device 606 of client device 100-1.

Audio renderer 602 may access the audio data assigned to the voice components 502 and may mix the audio data into the spatialized rendering 604 in any suitable way. For example, audio renderer 602 may positionally place the audio streams into the virtual space so that they may be perceived by the user of client device 100-1 as originating from the respective avatars of the users who are speaking. Audio renderer 602 may thus spatially mix all audio streams received over network connections 402-2 to render an output multi-channel spatial stream that the user hears, and may continually update spatial characteristics of this mix based on variables such as the location of the other avatars, the real-time pose/orientation of the avatars' heads (based on head turn data as described above), virtual physical objects in the environment that may acoustically affect audio (reverb, sound occlusion, etc., as defined by acoustic propagation data described above), and so forth. More particularly, spatialized rendering 604 of the audio data may be rendered as a multi-channel spatial audio stream representative of virtual sound simulated to arrive at the location of the user's avatar within the virtual space, and client application 108-1 may provide this multi-channel spatial audio stream to be presented to the user of client device 100-1 by multi-channel spatial audio reproduction device 606, which may be implemented by a set of headphones, a speaker system (e.g., a surround sound system, etc.), or another such sound generation system associated with client device 100-1.

Figure 7:
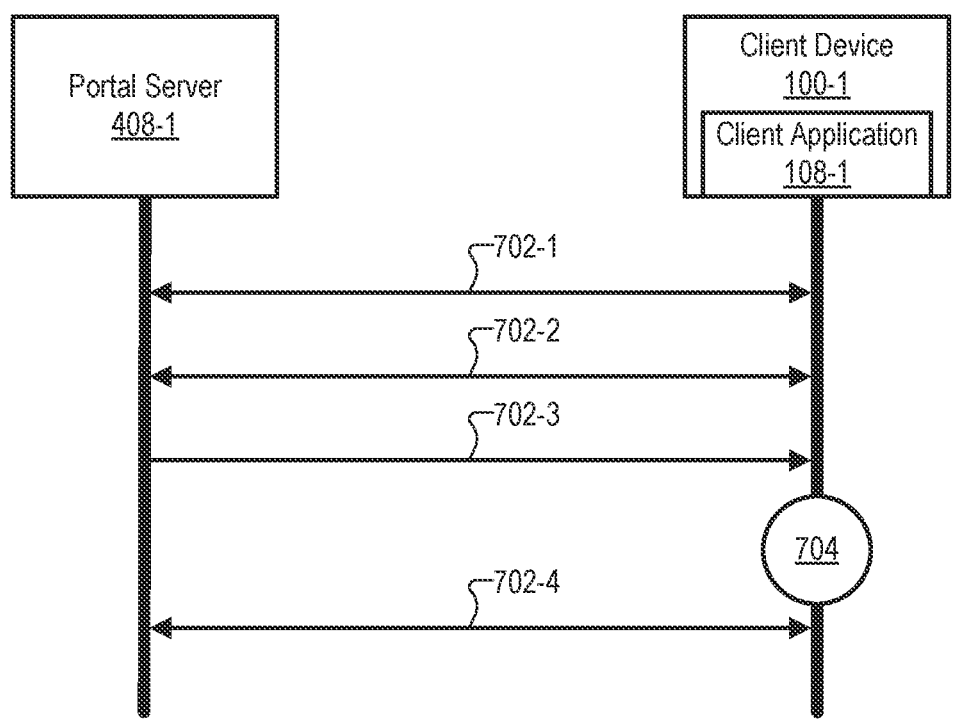
FIGS. 7-8 show illustrative dataflow diagrams of communications and operations performed by a client device and other computing systems in furtherance of spatial rendering of multi-user voice communication described herein.
Figure 8:
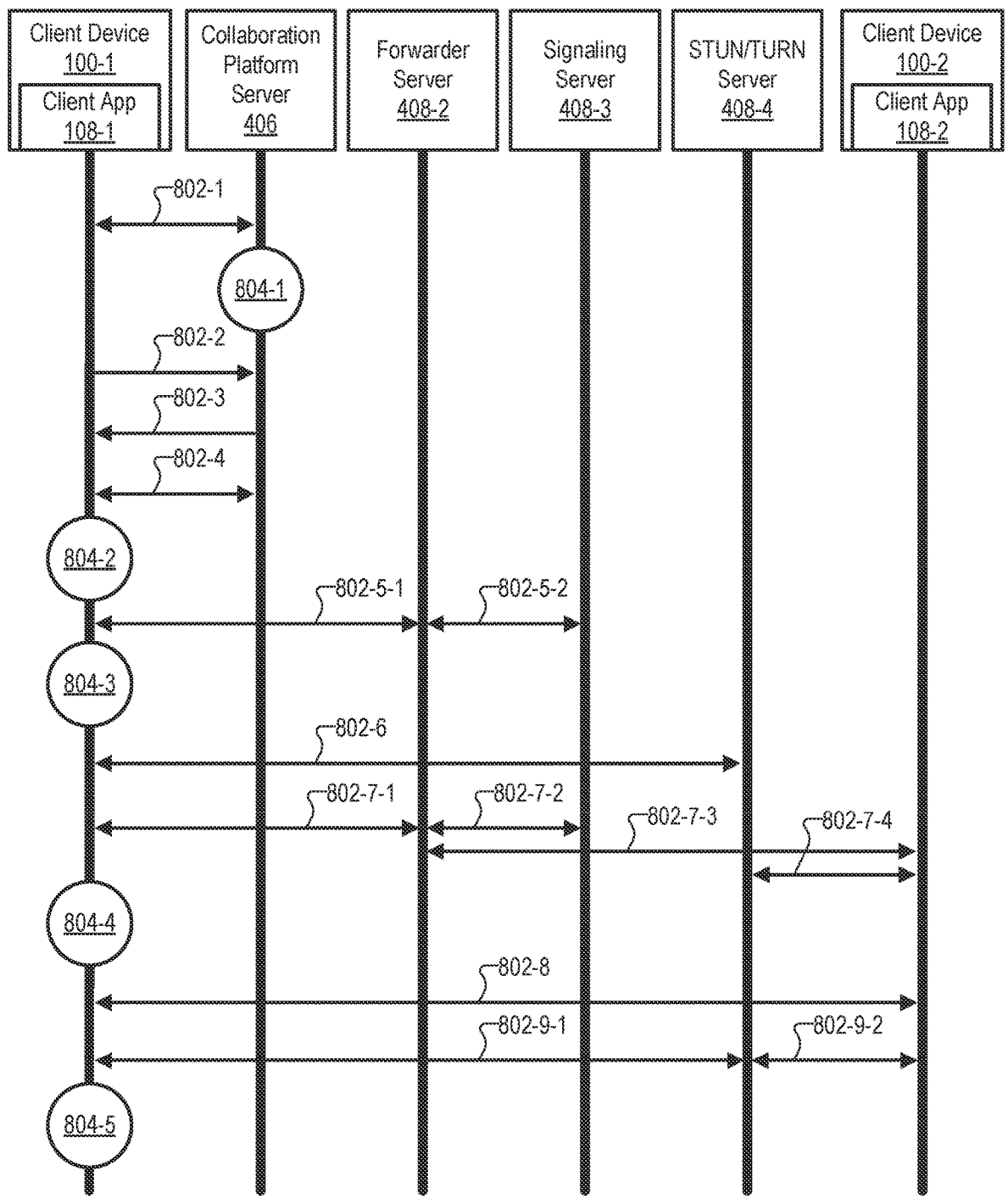

To illustrate the functionality of a client application in operation, FIGS. 7-8 show example dataflow diagrams of communications and operations that may be performed by client device 100-1 and other computing systems and services in furtherance of spatial rendering of multi-user voice communication described herein. More particularly, FIG. 7 shows a dataflow diagram 700 illustrating certain communications and operations involving client device 100-1 (executing client application 108-1) and a portal server (labeled as portal server 408-1). FIG. 8 shows a dataflow diagram 800 illustrating certain communications and operations involving client devices 100-1 and 100-2 (executing client applications 108-1 and 108-2, respectively), a collaboration platform server 406, a forwarder server (labeled as forwarder server 408-2), a signaling server (labeled as signaling server 408-3), and a STUN/TURN server (labeled as STUN/TURN server 408-4). Examples of these various devices and servers were described above in relation to FIG. 4.

In FIGS. 7 and 8, certain communications (communications 702-1 through 702-4 in FIG. 7 and communications 802-1 through 802-9 in FIG. 8) are illustrated as arrows extending between the different devices and/or servers. Additionally, between certain of these communications, certain operations (operation 704 in FIG. 7 and operations 804-1 through 804-5) are illustrated as circles being performed by particular devices and/or servers (e.g., in response to communications, in preparation for communications, etc.). It will be understood that the communications and operations illustrated in FIGS. 7 and 8 are examples only and that other implementations may perform more, fewer, or different communications and operations as may serve the particular implementation. Additionally, as will be apparent in the following description, a single communication 702 or 802 (e.g., a single arrow) may represent a back-and-forth data exchange involving multiple transfers of information between the devices/servers illustrated. Similarly, as will further be made apparent, a single operation 704 or 804 (e.g., a single circle) may represent multiple functions that the device/server performs. Each of the communications and operations of dataflow diagrams 700 and 800 will now be described in more detail.

FIG. 7 relates to security and initialization communications and operations that client application 108-1 may perform with respect to portal server 408-1 prior to communications with other servers such as collaboration platform server 406. For example, client application 108-1 and portal server 408-1 may exchange data between them to create and exchange a token for communicating with collaboration platform server 406, to provide and select from a list of potentials "rooms" within the virtual space that the user of client device 100-1 may choose to join, and so forth.

At communication 702-1, for example, the data exchange between client application 108-1 and portal server 408-1 may be configured to validate a version of client application 108-1 as being supported by collaboration platform server 406. To this end, communication 702-2 may include a transmission, by client application 108-1 to portal server 408-1, of version information for client application 108-1: a verification, by portal server 408-1, of whether the application is up to date (or, alternatively, if it is too far out of date to connect to the various collaboration platform servers that are available for different virtual spaces); and a transmission, by the portal server 408-1 back to client application 108-1, with the result of this query to either direct client application 108-1 to continue (in the case where the version is up to date) or to prompt the user to update the version (in the case that the version is not up to date).

At communication 702-2, the data exchange between client application 108-1 and portal server 408-1 may be configured to exchange and validate a security token for use in communicating with a collaboration platform server (e.g., collaboration platform server 406), such that the establishing of the first network connection with the collaboration platform server 406 can be performed using this security token. For example, at communication 702-2, client application 108-1 may transmit an authentication token (e.g., a user token associated with the user's account, etc.) to portal server 408-1 to establish a connection to the server. This token may be used by the voice chat meta client to establish a secure connection with forwarder server 408-2. Portal server 408-1 may validate the token and allow the client application to maintain a TCP-based connection to portal server 408-1 for the duration of the session.

At communication 702-3, the data exchange between client application 108-1 and portal server 408-1 may be configured to provide the client application with a room list indicating a plurality of rooms, within the virtual space, that are available for client device 100-1 to join. In some implementations, client application 108-1 may query portal server 408-1 for the room list and the providing of the room list may be performed in response to that query. The room list may include connection information for different collaboration platform servers associated with different rooms that are available to the user (e.g., including collaboration platform server 406, which is understood to be associated with the room ultimately chosen from the room list).

At operation 704, client application 108-1 selects a room to join from the room list provided at communication 702-3. For example, the user may be presented with room options and may indicate a chosen room from the list. As another example (or if the user fails to make a room selection in a timely manner, etc.), client application 108-1 may select a default room within the space.

At communication 702-4, the data exchange between client application 108-1 and portal server 408-1 may be configured to provide client application 108-1 with a room token for a particular room selected, by the client application from the plurality of rooms, at operation 704. In certain implementations, the client application may request the room token (i.e., a connection token specific to the collaboration platform server of the selected room) and the token may be provided by the portal server in response to this request.

After secure tokens have been passed and other startup communications and operations are complete (e.g., after a room has been selected, etc.), FIG. 8 shows communications and operations that client application 108-1 may perform with respect to various other servers to set up and perform spatial rendering of multi-user voice communication in accordance with methods and systems described herein. For example, client application 108-1 may establish a network connection with collaboration platform server 406 and use information from collaboration platform server 406 (and from other supporting services) to engage in a virtual communication session and to ultimately establish separate network connections with other client devices (e.g., client device 100-2) in the virtual room according to principles described herein.

At communication 802-1, client application 108-1 may establish a network connection between client device 100-1 and collaboration platform server 406. As mentioned above, the collaboration platform server 406 may be one server of a set of collaboration platform servers and may be associated with the particular room (of the plurality of rooms) that was selected at operation 704. As mentioned above, the establishing of this network connection with collaboration platform server 406 may be performed based on the room token provided to client application 108-1 by portal server 408-1. For instance, client application 108-1 may include this room token in a request for a connection token, portal server 408-1 may again validate the room token and confirm that client application 108-1 is allowed to access the room in question before returning the room token, and then client application 108-1 may establish a network connection (e.g., a UDP connection or another suitable connection) via the room token to the collaboration platform server for the selected room (i.e., to collaboration platform server 406). This network connection may be responsible for transmission of data needed to define objects within (and other components of) the virtual collaboration space and any properties (e.g., appearance properties, physical properties, behavioral properties, etc.) associated with therewith. This network connection may also be how the avatar's position and appearance (and any other such properties defining the user in the virtual space) is sent to the collaboration platform server to be replicated to corresponding client devices of other users in the selected room of the virtual space.

At operation 804-1, collaboration platform server 406 may assign a unique identifier to client application 108-1. More specifically, in response to the user of client device 100-1 selecting to join the room that collaboration platform server 406 corresponds to, the voice chat meta server of collaboration platform server 406 may allocate new components for the new entity and create a randomly-generated identifier (e.g., username, etc.) for the new device. The components instantiated by the voice chat meta server at operation 804-1 may be automatically replicated to the client devices 100 in the room (e.g., including client device 100-1, 100-2, and any other client devices 100 that are in the room but not explicitly shown in FIG. 8). As will be described in more detail below, the components allocated at operation 804-1 may persist until the user chooses to end the session or otherwise leaves the room, whereupon the components may be removed and other users may be notified of this change.

At communication 802-2, client application 108-1 may request information from collaboration platform server 406. For example, having successfully established the network connection at communication 802-1, client application 108-1 may, by way of communication 802-2, request the new components allocated at operation 804-1 (as well as other components associated with the room), the unique identifier generated at operation 804-1, and/or any other connection data or other information as may serve a particular implementation. More particularly, the voice chat meta client module of client application 108-1 may send a message at communication 802-2 to the voice chat meta server module of collaboration platform server 406 to request voice components, unique identifiers, and/or other connection data needed for initialization purposes.

At communication 802-3, then, the voice chat meta server module may receive this message and respond with the requested data. Moreover, once the voice chat meta client of client application 108-1 receives the response from collaboration platform server 406, the voice chat meta client notes the component instances, the identifier, the connection data, and any other data received, then waits for each of these component instances to be replicated (e.g., along with the rest of the room components). Ultimately, communication 802-3 may include receiving, by client application 108-1 and over the first network connection between client device 100-1 and collaboration platform server 406, replication of various components managed by collaboration platform server 406. These replicated components may include a first voice component associated with client device 100-1, a second voice component associated with client device 100-2, and various other components associated with other objects and aspects of the virtual space being managed by collaboration platform server 406.

At communication 802-4, after the components have been replicated onto client device 100-1 from collaboration platform server 406, client application 108-1 may request, from collaboration platform server 406 over the first network connection, authority over the first voice component associated with client application 108-1 (as well as, in certain examples, other components associated with client application 108-1), and may receive, in response to the requesting of the authority, a grant of authority over the first voice component (as well as any other applicable components). In this way, though the voice chat meta server of collaboration platform server 406 continues to manage the first voice component, client application 108-1 may acquire the authority to change the location of the voice component within the space and to otherwise control the voice component.

At operation 804-2, having received authority at communication 802-4, client application 108-1 may attach the first voice component to whatever location within the virtual space that the user chooses (e.g., to match the location of the user's avatar within the virtual space). As the user moves the avatar around within the virtual space (e.g., whether in a 2D mode, a 3D VR mode, or another suitable mode of operation), the first voice component and other components associated with the user's avatar or presence in the virtual space will be moved in the space in connection with the avatar. Accordingly, the setting of the first location at which the first voice component is positioned may be performed by client application 108-1 using the grant of authority over the first voice component that has been received at communication 802-4 by client application 108-1 from collaboration platform server 406.

At communications 802-5 (i.e., communication 802-5-1 between client device 100-1 and forwarder server 408-2 and communication 802-5-2 between forwarder server 408-2 and signaling server 408-3), client application 108-1 may request and receive a peer list from signaling server 408-3. The peer list may indicate each peer client device that has joined a room, within the virtual space, that client device 100-1 has also joined (i.e., the room selected in the ways described above and that is managed by collaboration platform server 406). It is noted that all traffic between client application 108-1 and signaling server 408-3 may occur via the forwarder server 408-2. It will also be understood that the connection flow shown in FIG. 8 to establish a network connection between client devices 100-1 and 100-2 may be used for any number of other client devices that are present in the room but not represented in FIG. 8.

At operation 804-3, client application 108-1 may select, from the peer list requested and received as part of communications 802-5, client device 100-2 as a peer client device with which voice communication is to be exchanged. As mentioned above, while client device 100-2 is used to illustrate one example, it will be understood that similar connections with other peer client devices not shown may also be established in a similar way as described for client device 100-2.

At communication 802-6, client application 108-1 may request connection information from STUN/TURN server 408-4 that the client application may use in establishing a connection with the selected peer. More specifically, for example, client application 108-1 may request and receive connection information for itself that client application 108-1 may later share with the selected peer device (e.g., client device 100-2 in this example) to help establish a network connection with that peer device.

At communications 802-7 (i.e., communication 802-7-1 between client application 108-1 and forwarder server 408-2, communication 802-7-2 between forwarder server 408-2 and signaling server 408-3, communication 802-7-3 between forwarder server 408-2 and client application 108-2, and communication 802-7-4 between client device 100-2 and STUN/TURN server 408-4), various communications may be performed to help establish the network connection between client device 100-1 and client device 100-2. For example, just as client device 100-1 received its own connection information at communication 802-6, client device 100-2 may similarly perform the same type of communication to request and receive its own connection information from STUN/TURN server 408-4. Accordingly, client application 108-1 may provide, based on the selecting of client device 100-2 at operation 804-3 and by way of signaling server 408-3, an offer for voice communication exchange to client device 100-2. In response, client application 108-1 may also receive, from client device 100-2 and by way of these communications 802-7, an answer to that offer. Along with such offers and answers, both client devices 100-1 and 100-2 may also share their connection information with one another (via signaling server 408-3) to establish the second network connection (e.g., the peer-to-peer or other indirect network connection) between them. In a similar way client application 108-1 may also establish network connections (e.g., direct peer-to-peer or other suitable network connections that use an intermediary server) with other peer client devices that have been selected, if there are more than one. Like the offer message sent to client device 100-2 described above, these other offer messages may serve to invite the peer client devices to connect and may include connection information (including the unique identifier) required by the invited peers to establish a connection with client device 100-1. Similarly to client application 108-2, any of these other peer devices that elect to accept the offer may transmit back an answer message that contains its own connection information (including its own unique identifier), which may be used by client application 108-1 to establish a network connection. As has been noted, all of these messages may be exchanged between peers via signaling server 408-3 (since direct connections have not yet been established between the peer client devices 100-1 and 100-2).

At operation 804-4, client application 108-1 may establish a network connection between client device 100-1 and client device 100-2 based on the answer message and the additional connection information received at communications 802-7. For example, as both peer client devices have exchanged connection information for one another, a direct peer-to-peer network connection may be established at operation 804-4 between client devices 100-1 and 100-2. As another example, such as if network restrictions preclude the direct peer-to-peer network connection from being established, operation 804-4 may involve establishing an indirect network connection between the client devices (e.g., a connection over which audio data may flow by way of STUN/TURN server 408-4 or another suitable intermediary such as an SFU).

At communication 802-8, audio data (e.g., voice chat data spoken by the respective users of client devices 100-1 and 100-2) is shown to flow directly between client devices 100-1 and 100-2 over a direct peer-to-peer network connection, Alternatively, at communications 802-9 (i.e., communication 802-9-1 between client device 100-1 and STUN/TURN server 408-4 and communication 802-9-2 between STUN/TURN server 408-4 and client device 100-2), audio data is shown to flow between chant device 100-1 and 100-2 over an indirect network connection by way of STUN/TURN server 408-4. It will be understood that, in certain implementations, other types of intermediary servers (e.g., SFUs, etc.) may be used instead of or in addition to STUN/TURN server 408-4.

Regardless of whether the network connection between client devices 100-1 and 100-2 is direct (as exemplified by communication 802-8) or indirect (as exemplified by communications 802-9), client application 108-1 may receive audio data from client device 100-2 and process this audio data in any of the ways described herein.

Operation 804-5 represents this receiving and processing of the audio data from client device 100-2. For example, at operation 804-5, client application 108-1 may receive the audio data, use the unique identifier of client application 108-2 to associate the audio data with the voice component for client device 100-2, spatialize the audio data in accordance with the location of that voice component within the virtual space, mix this with other spatialized audio data (from other client devices not shown, etc.) to generate a multi-channel spatial audio stream, output the multi-channel spatial audio stream to a sound reproduction device to allow the user of client device 100-1 to hear the multi-channel spatial audio stream, and so forth.

In the event that one of the peers voluntarily leaves the room after these connections have been established (e.g., to switch to another room, etc.), that peer may send a message to signaling server 408-3 representing the disconnection. Signaling server 408-3 may forward this message to all peers, who would then proceed to disconnect from the departed peer and close their connection with it. Similarly, in the event of an involuntary disconnection (e.g., due to a network outage, etc.), signaling server 408-3 may detect the disconnection (e.g., based on a network timeout, a dosed socket connection, etc.), and may proactively inform all peers of the disconnection of the departed peer. The dosing of a network connection may also involve ceasing transmission of the audio stream and its dissociation with the previously assigned voice component.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium (e.g., a memory, etc.), and executes those instructions, thereby performing one or more operations such as the operations described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random-access memory (DRAM), which typically constitutes a main memory. Common forms of computer-readable media include, for example, a disk, hard disk, magnetic tape, any other magnetic medium, a compact disc read-only memory (CD-ROM), a digital video disc (DVD), any other optical medium, random access memory (RAM), programmable read-only memory (PROM), electrically erasable programmable read-only memory (EPROM), FLASH-EEPROM, any other memory chip or cartridge, or any other tangible medium from which a computer can read.

Figure 9:
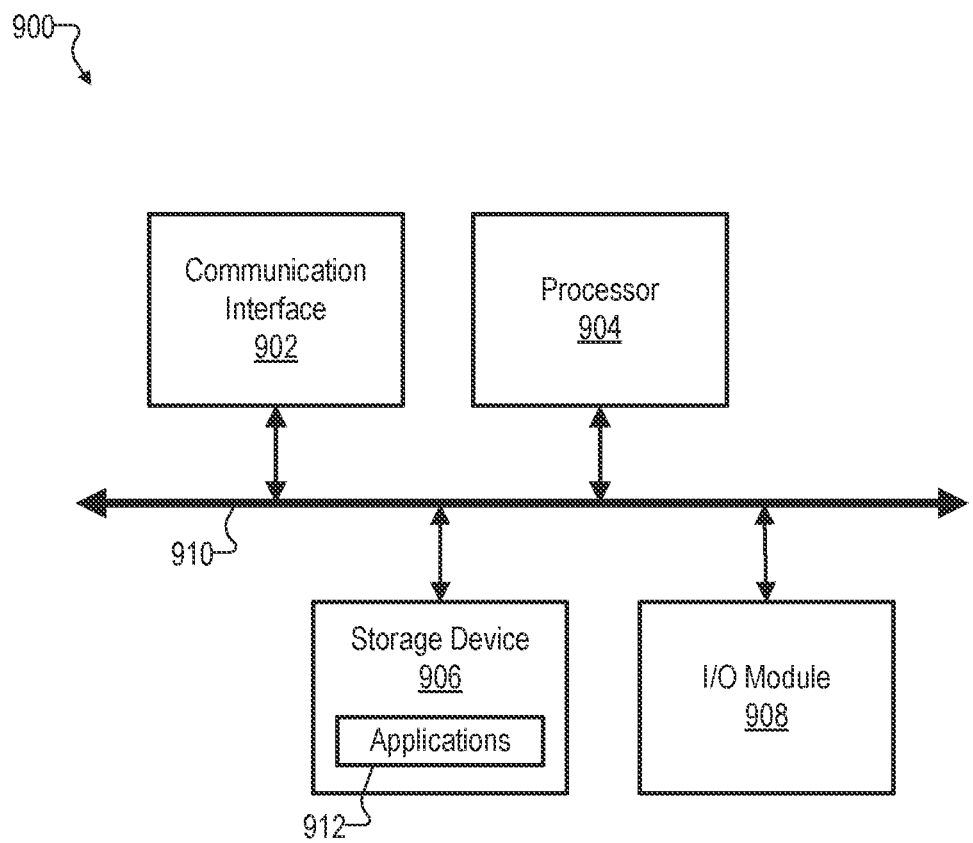
FIG. 9 shows an illustrative computing device that may implement chant devices, server systems and/or other computing systems in accordance with principles described herein.

FIG. 9 shows an illustrative computing device 900 that may implement client devices, server systems and/or other computing systems in accordance with principles described herein. For example, computing device 900 may include or implement (or partially implement) a client device 100 executing a client application 108, a server device (e.g., a MEC computing device, a cloud computing device, etc.) hosting a collaboration platform server 406 and/or one or more of the other servers 408 described above, certain elements of network 404, any elements or components included therein, or any other computing devices or systems described herein.

As shown in FIG. 9, computing device 900 may include a communication interface 902, a processor 904, a storage device 906, and an input/output (U0) module 908 communicatively connected via a communication infrastructure 910. While an illustrative computing device 900 is shown in FIG. 9, the components illustrated in FIG. 9 are not intended to be limiting. Additional or alternative components may be used in other embodiments. Components of computing device 900 shown in FIG. 9 will now be described in additional detail.

Communication interface 902 may be configured to communicate with one or more computing devices. Examples of communication interface 902 include, without limitation, a wired network interface (such as a network interface card), a wireless network interface (such as a wireless network interface card), a modem, an audio/video connection, and any other suitable interface.

Processor 904 generally represents any type or form of processing unit capable of processing data or interpreting, executing, and/or directing execution of one or more of the instructions, processes, and/or operations described herein. Processor 904 may direct execution of operations in accordance with one or more applications 912 or other computer-executable instructions such as may be stored in storage device 906 or another computer-readable medium.

Storage device 906 may include one or more data storage media, devices, or configurations and may employ any type, form, and combination of data storage media and/or device. For example, storage device 906 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 906. For example, data representative of one or more executable applications 912 configured to direct processor 904 to perform any of the operations described herein may be stored within storage device 906. In some examples, data may be arranged in one or more databases residing within storage device 906.

I/O module 908 may include one or more I/O modules configured to receive user input and provide user output. One or more I/O modules may be used to receive input for a single virtual experience. I/O module 908 may include any hardware, firmware, software, or combination thereof supportive of input and output capabilities. For example, I/O module 908 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 908 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 900. For example, one or more applications 912 residing within storage device 906 may be configured to direct processor 904 to perform one or more processes or functions associated with processor 104 of client device 100. Likewise, memory 102 of client device 100 may be implemented by or within storage device 906.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

In the preceding description, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method comprising:
    establishing, by an application executing on a first device operated by a user, a first network connection between the first device and a collaboration platform server, the collaboration platform server managing master versions of a set of components for a collaboration platform that provides voice communication services with respect to a virtual space, wherein the master versions of the set of components managed by the collaboration platform server include:
        a master version of a first voice component configured to manage voice communication originating at the first device, and
        a master version of a second voice component configured to manage voice communication originating at a second device separate from the first device;
    setting, by the application and by way of communication with the collaboration platform server over the first network connection, the master version of the first voice component to include a first location, within the virtual space, at which the first voice component is positioned;
    determining, by the application and based on the master version of the second voice component as communicated by the collaboration platform server over the first network connection, a second location, within the virtual space, at which the second voice component is positioned;
    receiving, by the application and by way of a second network connection between the first device and the second device, audio data representative of voice communication originating at the second device; and
    generating, by the application and based on the first and second locations, a spatialized rendering of the audio data for presentation to the user.

2. The method of claim 1, further comprising:
    receiving, by the application and over the first network connection, replication of the master versions of the first and second voice components managed by the collaboration platform server, wherein data received as part of the replication includes:
        a first identifier assigned by the collaboration platform server to be unique to the first voice component, and
        a second identifier assigned by the collaboration platform server to be unique to the second voice component; and
    establishing, by the application and based on the first and second identifiers, the second network connection between the first device and the second device;
    wherein:
        the audio data is associated with the second identifier when the audio data is received; and
        the generating of the spatialized rendering of the audio data includes assigning, by the application and based on the audio data being associated with the second identifier, the audio data to the second voice component at the second location at which the second voice component is positioned.

3. The method of claim 1, further comprising exchanging data between the application and a portal server, the exchanging of the data configured to:
    validate a version of the application as being supported by the collaboration platform server; and
    exchange a security token for use in communicating with the collaboration platform server;
    wherein the establishing of the first network connection is performed using the security token.

4. The method of claim 1, further comprising exchanging data between the application and a portal server, the exchanging of the data configured to:
    provide the application with a room list indicating a plurality of rooms, within the virtual space, that are available for the first device to join; and
    provide the application with a room token for a particular room selected by the application from the plurality of rooms;
    wherein:
        the collaboration platform server is one server of a set of collaboration platform servers and is associated with the particular room of the plurality of rooms; and
        the establishing of the first network connection is performed based on the room token provided to the application by the portal server.

5. The method of claim 1, further comprising:
receiving, by the application and over the first network connection, replication of the master version of the first voice component managed by the collaboration platform server;
requesting, by the application and from the collaboration platform server over the first network connection, authority over the master version of the first voice component; and
receiving, by the application in response to the requesting of the authority, a grant of authority over the master version of the first voice component;
wherein the setting of the first location at which the first voice component is positioned is performed by the application using the grant of authority over the master version of the first voice component that has been received by the application from the collaboration platform server.

6. The method of claim 1, further comprising establishing, by the application, the second network connection between the first device and the second device, the establishing of the second network connection including:
requesting and receiving, by the application from a signaling server, a peer list indicating each peer device that has joined a room, within the virtual space, that the first device has also joined;
selecting, by the application from the peer list, the second device as a peer device with which voice communication is to be exchanged;
providing, by the application and based on the selecting of the second device, an offer for voice communication exchange to the second device;
receiving, by the application and from the second device, an answer to the offer and additional connection information; and
establishing the second network connection based on the answer and the additional connection information.

7. The method of claim 1, wherein the second network connection between the first device and the second device is a peer-to-peer connection by way of which the audio data is delivered directly from the second device to the first device without assistance from an intermediary server.

8. The method of claim 1, further comprising:
determining, by the application and based on a master version of a third voice component as communicated by the collaboration platform server over the first network connection, a third location, within the virtual space, at which the third voice component is positioned, the third voice component included in the set of components managed by the collaboration platform server and configured to manage voice communication originating at a third device separate from the first and second devices; and
receiving, by the application and by way of a third network connection between the first device and the third device, additional audio data representative of voice communication originating at the third device;
wherein the spatialized rendering of the audio data is further based on the third location and is further generated to include the additional audio data.

9. The method of claim 1, wherein:
the generating of the spatialized rendering of the audio data is configured to account for head turn data to simulate sound propagation from the second location, through the virtual space, to a virtual avatar at the first location; and
the virtual avatar is oriented in a manner selected by the user and indicated by the head turn data.

10. The method of claim 1, wherein:
the generating of the spatialized rendering of the audio data is configured to account for acoustic propagation data to simulate sound propagation from the second location, through the virtual space, to a virtual avatar at the first location;
the sound propagation is simulated to interact with a virtual object between the first and second locations within the virtual space; and
an acoustic property of the virtual object is represented by the acoustic propagation data.

11. The method of claim 1, wherein:
the spatialized rendering of the audio data is a multi-channel spatial audio stream representative of virtual sound simulated to arrive at the first location within the virtual space; and
the method further comprises providing, by the application, the multi-channel spatial audio stream for presentation to the user by a multi-channel spatial audio reproduction device associated with the first device.

12. A system comprising:
a memory storing instructions; and
a processor included within a first device operated by a user, the processor communicatively coupled to the memory and configured to execute the instructions to:
establish a first network connection between the first device and a collaboration platform server, the collaboration platform server managing master versions of a set of components for a collaboration platform that provides voice communication services with respect to a virtual space, wherein the master versions of the set of components managed by the collaboration platform server include:
a master version of a first voice component configured to manage voice communication originating at the first device, and
a master version of a second voice component configured to manage voice communication originating at a second device separate from the first device;
set, by way of communication with the collaboration platform server over the first network connection, the master version of the first voice component to include a first location, within the virtual space, at which the first voice component is positioned;
determine, based on the master version of the second voice component as communicated by the collaboration platform server over the first network connection, a second location, within the virtual space, at which the second voice component is positioned;
receive, by way of a second network connection between the first device and the second device, audio data representative of voice communication originating at the second device; and
generate, based on the first and second locations, a spatialized rendering of the audio data for presentation to the user.

13. The system of claim 12, wherein:
the processor is further configured to execute the instructions to:
receive, over the first network connection, replication of the master versions of the first and second voice components managed by the collaboration platform server, wherein data received as part of the replication includes:

a first identifier assigned by the collaboration platform server to be unique to the first voice component, and a second identifier assigned by the collaboration platform server to be unique to the second voice component; and establish, based on the first and second identifiers, the second network connection between the first device and the second device;

the audio data is associated with the second identifier when the audio data is received; and the generating of the spatialized rendering of the audio data includes assigning, based on the audio data being associated with the second identifier, the audio data to the second voice component at the second location at which the second voice component is positioned.

14. A non-transitory computer-readable medium storing instructions that, when executed, direct a processor of a first device operated by a user to:

establish a first network connection between the first device and a collaboration platform server, the collaboration platform server managing master versions of a set of components for a collaboration platform that provides voice communication services with respect to a virtual space, wherein the master versions of the set of components managed by the collaboration platform server include:

a master version of a first voice component configured to manage voice communication originating at the first device, and a master version of a second voice component configured to manage voice communication originating at a second device separate from the first device;

set, by way of communication with the collaboration platform server over the first network connection, the master version of the first voice component to include a first location, within the virtual space, at which the first voice component is positioned;

determine, based on the master version of the second voice component as communicated by the collaboration platform server over the first network connection, a second location, within the virtual space, at which the second voice component is positioned;

receive, by way of a second network connection between the first device and the second device, audio data representative of voice communication originating at the second device; and generate, based on the first and second locations, a spatialized rendering of the audio data for presentation to the user.

15. The non-transitory computer-readable medium of claim 14, wherein:

the instructions further direct the processor to:

receive, over the first network connection, replication of the master versions of the first and second voice components managed by the collaboration platform server, wherein data received as part of the replication includes:

a first identifier assigned by the collaboration platform server to be unique to the first voice component, and a second identifier assigned by the collaboration platform server to be unique to the second voice component; and establish, based on the first and second identifiers, the second network connection between the first device and the second device;

the audio data is associated with the second identifier when the audio data is received; and the generating of the spatialized rendering of the audio data includes assigning, based on the audio data being associated with the second identifier, the audio data to the second voice component at the second location at which the second voice component is positioned.

16. The non-transitory computer-readable medium of claim 14, wherein:

the instructions further direct the processor to exchange data between an application executing on the first device and a portal server, the exchanging of the data configured to:

provide the application with a room list indicating a plurality of rooms, within the virtual space, that are available for the first device to join; and provide the application with a room token for a particular room selected by the application from the plurality of rooms;

the collaboration platform server is one server of a set of collaboration platform servers and is associated with the particular room of the plurality of rooms; and the establishing of the first network connection is performed based on the room token provided to the application by the portal server.

17. The non-transitory computer-readable medium of claim 14, wherein:

the instructions further direct the processor to:

receive, over the first network connection, replication of the master version of the first voice component managed by the collaboration platform server;

request, from the collaboration platform server over the first network connection, authority over the master version of the first voice component; and receive, in response to the requesting of the authority, a grant of authority over the master version of the first voice component;

wherein the setting of the first location at which the first voice component is positioned is performed using the grant of authority over the master version of the first voice component that has been received from the collaboration platform server.

18. The non-transitory computer-readable medium of claim 14, wherein the second network connection between the first device and the second device is a peer-to-peer connection by way of which the audio data is delivered directly from the second device to the first device without assistance from an intermediary server.

19. The non-transitory computer-readable medium of claim 14, wherein:

the instructions further direct the processor to:

determine, based on a master version of a third voice component as communicated by the collaboration platform server over the first network connection, a third location, within the virtual space, at which the third voice component is positioned, the third voice component included in the set of components managed by the collaboration platform server and configured to manage voice communication originating at a third device separate from the first and second devices; and receive, by way of a third network connection between the first device and the third device, additional audio data representative of voice communication originating at the third device; and the spatialized rendering of the audio data is further based on the third location and is further generated to include the additional audio data.

20. The non-transitory computer-readable medium of claim 14, wherein:
the generating of the spatialized rendering of the audio data is configured to account for head turn data and acoustic propagation data to simulate sound propagation from the second location, through the virtual space, to a virtual avatar at the first location;
the virtual avatar is oriented in a manner selected by the user and indicated by the head turn data;
the sound propagation is simulated to interact with a virtual object between the first and second locations within the virtual space; and
an acoustic property of the virtual object is represented by the acoustic propagation data.

\* \* \* \* \*